US008503452B2

(12) United States Patent
Jain et al.

(10) Patent No.: US 8,503,452 B2
(45) Date of Patent: Aug. 6, 2013

(54) METHOD AND APPARATUS FOR IMPROVING DATA TRANSMISSION RELIABILITY IN A WIRELESS COMMUNICATIONS SYSTEM

(75) Inventors: Avinash Jain, San Diego, CA (US); Stein Arne Lundby, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 12/015,740

(22) Filed: Jan. 17, 2008

(65) Prior Publication Data
US 2008/0130643 A1    Jun. 5, 2008

Related U.S. Application Data

(62) Division of application No. 11/086,957, filed on Mar. 21, 2005.

(51) Int. Cl.
*H04L 12/28* (2006.01)
*H04L 12/56* (2006.01)

(52) U.S. Cl.
USPC ........... 370/394; 370/236; 714/746; 714/748; 714/749

(58) Field of Classification Search
USPC ........... 370/394, 229–236, 474; 714/746–750
See application file for complete search history.

(56) References Cited

U.S. PATENT DOCUMENTS

| 6,021,124 | A | 2/2000 | Haartsen |
| 6,901,063 | B2 | 5/2005 | Vayanos et al. |
| 7,277,439 | B2 | 10/2007 | Rosier et al. |
| 7,286,540 | B2 * | 10/2007 | Kim et al. ............ 370/394 |
| 2002/0181603 | A1 | 12/2002 | Kim et al. |
| 2003/0067907 | A1 | 4/2003 | Rezaiifar et al. |
| 2003/0076810 | A1 * | 4/2003 | Rezaiifar et al. ............ 370/349 |

(Continued)

FOREIGN PATENT DOCUMENTS

| CA | 2462697 A1 | 4/2003 |
| EP | 0633678 A1 | 1/1995 |

(Continued)

OTHER PUBLICATIONS

ASUSTeK, Missing gap removal in the reordering entity, 3GPP TSG-RAN WG2#27 R2-020240. Feb. 2002, URL http://www.3gpp.org/ftp/tsg_ran/WG2_RL2/TSGR2_27/Docs/Zips/R2-020240.zip.

(Continued)

*Primary Examiner* — Ajit Patel
(74) *Attorney, Agent, or Firm* — Rupit M. Patel

(57) ABSTRACT

Techniques for performing duplicate detection and re-ordering for a HARQ transmission are described. For duplicate detection, a receiver determines whether a decoded packet x for an ARQ channel y is a duplicate packet based on packet x and a prior decoded packet for ARQ channel y. For re-ordering, the receiver determines whether an earlier packet is still pending on any other ARQ channel based on prior decoded packets for the ARQ channels and forwards packet x only if there are no pending earlier packets. There are no pending earlier packets on another ARQ channel z if (1) a decoded packet was received on ARQ channel z at a designated time or later or (2) a decoded packet was not received on ARQ channel z within a time window from current time.

18 Claims, 10 Drawing Sheets

U.S. PATENT DOCUMENTS

| | | |
|---|---|---|
| 2003/0174663 A1 | 9/2003 | Dillon |
| 2003/0210669 A1* | 11/2003 | Vayanos et al. ............... 370/335 |
| 2004/0039979 A1 | 2/2004 | Garani |
| 2004/0148552 A1 | 7/2004 | Matsumoto et al. |
| 2006/0062223 A1* | 3/2006 | Manuel et al. ............... 370/394 |
| 2006/0079264 A1* | 4/2006 | Gu et al. ....................... 455/522 |
| 2006/0092972 A1* | 5/2006 | Petrovic et al. ............... 370/469 |
| 2006/0209783 A1 | 9/2006 | Jain et al. |
| 2010/0246497 A1 | 9/2010 | Kim et al. |

FOREIGN PATENT DOCUMENTS

| | | |
|---|---|---|
| EP | 1257081 A2 | 11/2002 |
| JP | 2001516177 A | 9/2001 |
| JP | 2002044094 | 2/2002 |
| JP | 2002135233 | 5/2002 |
| JP | 2004112761 | 4/2004 |
| WO | 9631952 | 10/1996 |
| WO | WO9909698 A1 | 2/1999 |
| WO | WO0137493 A1 | 5/2001 |
| WO | WO0233876 A1 | 4/2002 |
| WO | 03096600 | 11/2003 |
| WO | WO03105394 | 12/2003 |

OTHER PUBLICATIONS

International Search Report PCT/US06/010501—International Search Authority, European Patent Office, Aug. 25, 2006.

Written Opinion—PCT/US06/010501—International Search Authority, European Patent Office, Aug. 25, 2006.

* cited by examiner

METHOD AND APPARATUS FOR IMPROVING DATA TRANSMISSION RELIABILITY IN A WIRELESS COMMUNICATIONS SYSTEM

BACKGROUND

I. Field

The present invention relates generally to wireless communications, and more specifically to techniques for improving data transmission reliability.

II. Background

Many wireless communication systems employ HARQ to improve reliability for data transmission. With HARQ, each data packet may be transmitted once or multiple times by a transmitter until the packet is correctly decoded by a receiver or the maximum number of transmissions has been sent for the packet. A HARQ entity at the transmitter (which is often called a transmitter HARQ entity) receives packets that have been assigned sequence numbers, encodes each packet into one or several subpackets, and transmits these subpackets in sequential order.

A corresponding HARQ entity at the receiver (which is often called a receiver HARQ entity) receives the transmissions from the transmitter and combines the subpackets that belong to the same packet. The combined subpackets for each transmitted packet are then decoded in an attempt to recover the transmitted packet. However, due to degradation caused by deleterious effects in a wireless link, some of the received packets may be decoded in error and are called erased packets. The receiver may send to the transmitter an acknowledgment (ACK) for each correctly decoded packet to terminate the transmission of further subpackets for this packet and/or a negative acknowledgment (NAK) for each erased packet to initiate transmission of another subpacket for the packet. The transmitter may erroneously receive the ACKs and/or NAKs sent by the receiver. Each ACK that is erroneously detected as a NAK by the transmitter results in the transmission of another subpacket for a packet that has already been correctly decoded by the receiver. The redundant transmission may be correctly decoded by the receiver and result in a duplicate packet. The error rate for the ACK transmissions may be high and, consequently, the receiver may frequently obtain duplicate packets.

The receiver HARQ entity is also tasked with providing correctly decoded packets to upper layers. In many systems, the upper layers expect to receive data in the proper order, as determined by the sequence numbers of the packets. With HARQ, even though the transmitter HARQ entity sends the first subpackets in sequential order, the receiver HARQ entity may recover the packets out of order because of the additional subpacket transmissions for erased packets. As a result, the receiver HARQ entity typically buffers packets that have been correctly decoded, re-orders these packets as necessary, and provides the re-ordered packets to the upper layers. If packets are recovered out of order, then the receiver HARQ entity may "stall" or delay the delivery of correctly decoded packets to the upper layers whenever earlier packets are detected to be missing, until either (1) the missing packets are correctly decoded by the receiver HARQ entity or (2) the receiver HARQ entity is confident that the missing packets are lost and will not be received. If the receiver HARQ entity declares a packet to be lost when such is not the case, then the upper layers may (1) initiate retransmission of the lost packet, albeit with a long delay, or (2) treat the packet as being lost, both of which are undesirable.

In a simple re-ordering scheme, the receiver stores each correctly decoded packet in a buffer until the maximum time duration for transmitting all earlier packets has expired. The receiver then provides the correctly decoded packet to the upper layers after this maximum time duration has expired, with confidence that any earlier packets that are still missing will not be received. However, the delay for delivering packets to the upper layers may be overly long for this simple re-ordering scheme.

There is therefore a need in the art for techniques to efficiently perform duplicate detection and re-ordering for a HARQ transmission.

SUMMARY

Techniques for performing duplicate detection and reordering for a HARQ transmission are described herein. For a synchronous HARQ system, multiple ARQ channels are used for the HARQ transmission, and the time at which each ARQ channel is sent is known a priori by both a transmitter and a receiver for the HARQ transmission. For an asynchronous HARQ system, the time between subsequent subpacket transmissions on same ARQ channel is variable and is determined by a scheduling entity based on channel and/or other characteristics. If the scheduling entity resides at the transmitter, which is typically the case for the forward link (or downlink), then a reliable control mechanism may be used to inform the receiver the time at which each ARQ channel is sent. For a system with a completely scheduled reverse link (or uplink), the scheduling entity is at the receiver, which is then aware of the time at which each ARQ channel is sent. For both synchronous and asynchronous HARQ systems, it is assumed that both the transmitter and the receiver know the time at which each ARQ channel is sent.

For the HARQ transmission, the transmitter receives a sequence of data packets that may be assigned sequence numbers to indicate their order in the sequence. The transmitter processes each packet and generates multiple subpackets that are assigned sequentially numbered subpacket identifiers (SPIDs). The transmitter transmits the packets in sequential order (based on their sequence numbers, or arrival order from the upper layers) on the ARQ channels as these channels become available. Each packet is sent on one ARQ channel. For each packet, the subpackets for that packet are sent in sequential order based on their SPIDs, one subpacket at a time until an ACK is received for the packet or all subpackets have been sent.

For duplicate detection, the receiver determines whether a given correctly decoded packet x for a given ARQ channel y is a duplicate packet based on correctly decoded packet x and a prior correctly decoded packet for ARQ channel y. Upon obtaining the prior correctly decoded packet, the receiver sets an unexpected SPID for ARQ channel y to the SPID l of the last subpacket received for the prior correctly decoded packet plus one, i.e., unexpected SPID=l+1. The unexpected SPID is the SPID for a subpacket that is not expected to be received on ARQ channel y. For example, the receiver may send an ACK for the prior correctly decoded packet, which may be erroneously detected as a NAK by the transmitter, which may then transmit the next subpacket with SPID of l+1. The receiver obtains the SPID of the last subpacket received for correctly decoded packet x, compares the SPID of this subpacket to the unexpected SPID, and declares packet x to be a duplicate packet if the two SPIDs match. The receiver increments the unexpected SPID each time a subpacket may be sent on ARQ channel y, so that the unexpected SPID tracks the SPID of the subpacket not expected to be received on ARQ channel y. This incrementing is done even if the receiver did not detect a transmission. For example, the receiver may decode a packet with SPID=l on ARQ channel y and send an ACK which is erroneously detected as a NAK by the transmitter. The receiver may not detect subsequent subpacket transmission of SPID=l+1 on ARQ channel y, but detect the transmission after that which has SPID=l+2. By always incrementing the unexpected SPID, the receiver ensures that it always detects duplicate packets, even if it does not detect some subpackets.

For re-ordering, the receiver obtains correctly decoded packet x for ARQ channel y, determines whether an earlier packet is still pending on any other ARQ channel based on prior correctly decoded packets (if any) for the ARQ channels, and forwards packet x to the upper layers if there are no pending earlier packets. Each pending earlier packet is a packet that was sent before packet x and which may still be received. There are no pending earlier packets on another ARQ channel z if (1) a correctly decoded packet was received on ARQ channel z at a designated time or later or (2) a correctly decoded packet was not received on ARQ channel z within a time window from the current frame. The designated time is determined by the start time for packet x and the number of ARQ channels available for the HARQ transmission. For synchronous HARQ, the time window is determined by the maximum number of subpackets for each packet and the number of ARQ channels. For asynchronous HARQ in a scheduled system, the time window for transmission on each ARQ channel is known to the scheduling entity.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The duplicate detection and re-ordering techniques described herein may be used for various communication systems such as a Code Division Multiple Access (CDMA) system, a Time Division Multiple Access (TDMA) system, a Frequency Division Multiple Access (FDMA) system, an Orthogonal Frequency Division Multiple Access (OFDMA), an Ultra-Wideband System (UWB) and so on. A CDMA system may implement cdma2000, Wideband-CDMA (W-CDMA), or some other CDMA radio access technologies (RATs). A TDMA system may implement Global System for Mobile Communications (GSM) or some other RAT. An OFDM system may implement IEEE 802.11, IEEE 802.16, or IEEE 802.20. An UWB system may implement 802.15. cdma2000 covers IS-95, IS-2000, and IS-856 and is described in documents from a consortium named "3rd Generation Partnership Project 2" (3GPP2). W-CDMA and GSM are described in documents from a consortium named "3rd Generation Partnership Project" (3GPP). 3GPP and 3GPP2 documents are publicly available. The duplicate detection and re-ordering techniques may also be used for the forward link (or downlink) and the reverse link (or uplink). For clarity, these techniques are described for the reverse link in cdma2000 Revision D.

Figure 1:
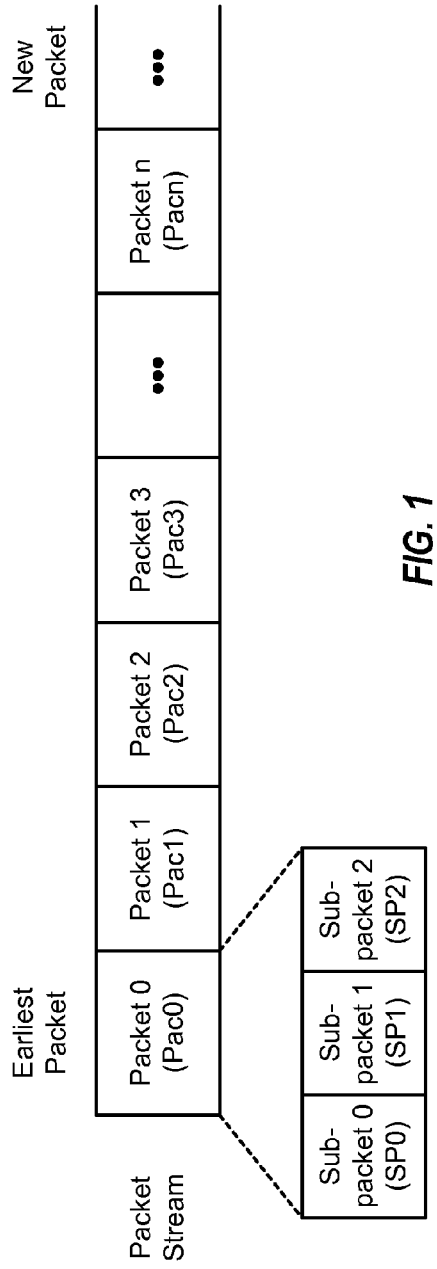
FIG. 1 shows packet processing for an HARQ system.

FIG. 1 shows packet processing for an HARQ system. A wireless device processes each data packet to generate a coded packet and further partitions the coded packet into three subpackets. The data/coded packets are assigned sequential sequence numbers and are labeled as Pac0, Pac1, Pac2, and so on, in FIG. 1. The three subpackets for each coded packet are assigned subpacket identifiers (SPIDs) of '0', '1', and '2' and are labeled as SP0, SP1, and SP2 in FIG. 1. Each subpacket contains sufficient information to allow a receiving base station to decode the subpacket under favorable channel condition and recover the packet. The three subpackets for each packet contain different redundancy information for the packet. The three subpackets for a packet may be viewed as different versions of the packet or different transmissions for the packet.

The coded packets are transmitted starting in sequential order. Thus, the earliest packet 0 (Pac0) is transmitted before packet 1 (Pac1), which is transmitted before packet 2 (Pac2), which is transmitted before packet 3 (Pac3), and so on. For each packet, the three subpackets are transmitted in sequential order on same ARQ channel. Thus, subpacket 0 (SP0) is transmitted first, followed by subpacket 1 (SP1) if needed, and followed by subpacket 2 (SP2) if needed. One, two, or all three subpackets may be transmitted for each packet. The packet processing and transmission described above may be used for data/traffic channels in various systems such as, for example, a Reverse Packet Data Channel (R-PDCH) in cdma2000 Revision D. For clarity, certain details are described below for the R-PDCH.

Figure 2:
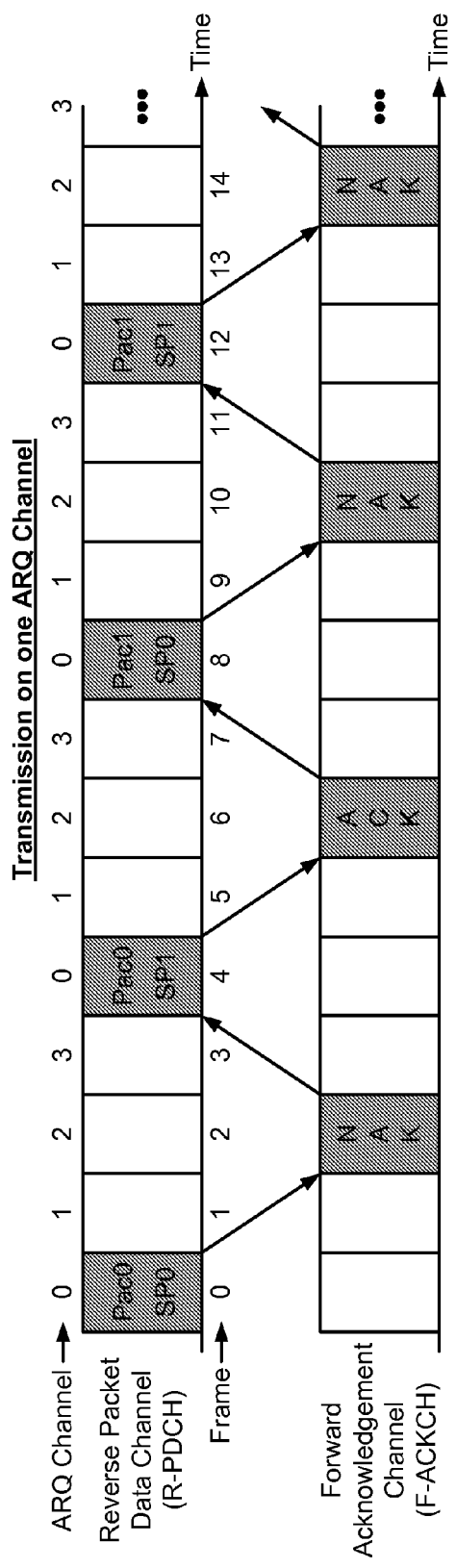
FIG. 2 shows a synchronous HARQ transmission on one ARQ channel.

FIG. 2 shows the structure for a data channel in a synchronous HARQ system. The transmission time line for the data channel is partitioned into frames, with each frame having a fixed duration (e.g., 10 milliseconds (ms) for the R-PDCH in cdma2000). One subpacket may be sent in each frame. The transmission time line is further partitioned into four ARQ channels, which are assigned ARQ channel identifiers (AC-IDs) of '0', '1', '2', and '3'. The four ARQ channels are interlaced such that ARQ channel 0 with ACID=0 occupies every fourth frame starting at a predefined frame, ARQ channel 1 with ACID=1 occupies every fourth frame immediately following ARQ channel 0, ARQ channel 2 with ACID=2 occupies every fourth frame immediately following ARQ channel 1, and ARQ channel 3 with ACID=3 occupies every fourth frame immediately following ARQ channel 2. The frames used for all four ARQ channels are defined based on system time (SYS_TIME) and are known by the wireless device and the base station. The four ARQ channels are also referred to as ARQ instances and may be viewed as four logical channels or four subchannels of the data channel in the synchronous HARQ system.

FIG. 2 also shows an exemplary synchronous HARQ transmission on one ARQ channel. Each packet is transmitted and possibly retransmitted on a single ARQ channel. For a given packet, the wireless device first transmits subpacket 0 in a frame for an ARQ channel, then subpacket 1 (if needed) in the next available frame for the same ARQ channel, and finally subpacket 2 (if needed) in the next available frame for the ARQ channel. As each subpacket is received, the base station attempts to decode the packet based on all subpackets that have been received for the packet. If the decoding is successful, then the base station sends an ACK on a Forward Acknowledgment Channel (F-ACKCH), and the wireless device stops sending subpackets for this packet. Conversely, if the decoding is unsuccessful, then the base station sends a NAK on the F-ACKCH, and the wireless device sends the next subpacket for the packet. The delay for sending the NAK or ACK is one frame. In an asynchronous HARQ system, the transmission of each subpacket also takes place sequentially on the same ARQ channel, but there is no fixed time duration between consecutive transmissions of same ARQ channel.

For the example shown in FIG. 2, the wireless device transmits subpacket 0 of packet 0, which is decoded in error by the base station. The wireless device then transmits subpacket 1 of packet 0, which is decoded correctly and hence an ACK was sent back. The wireless device then transmits subpacket 0 of the next packet 1, which is decoded in error by the base station. The wireless device then transmits subpacket 1 of packet 1. Data transmission continues in this manner for other packets.

For clarity, FIG. 2 shows transmission of both NAKs and ACKs. Many systems send only ACKs or only NAKs to reduce the amount of signaling. For an ACK-based scheme, a receiver sends an ACK only if a packet is decoded correctly and does not send any NAK. ACKs are thus explicitly sent, and NAKs are implicit sent (i.e., presumed by the absence of ACKs or indicated in some other manners). For a NAK-based scheme, the receiver sends a NAK only if a packet is decoded in error and does not send any ACK. The techniques described herein may be used with any kind of feedback.

A receiver can determine whether a given packet is decoded correctly or in error based on an error detection code used for the packet. For example, a packet is decoded correctly if a cyclic redundancy check (CRC) for the packet passes and decoded in error if the CRC fails. As used herein, a decoded packet is a packet that is decoded correctly by the receiver (e.g., the CRC passes), and an erased packet is a packet that is decoded in error by the receiver (e.g., the CRC fails).

As shown in FIG. 2, some delays are incurred to transmit a subpacket, decode a packet, and send back an ACK or NAK. The subpacket transmissions for each ARQ channel are separated by four frames to account for the processing and transmission delays. The wireless device can transmit up to four packets in parallel on the four ARQ channels. At any given moment, there can be up to four outstanding packet transmissions. Each outstanding packet transmission is for a packet that has not been acknowledged as being decoded by the base station.

Figure 3A:
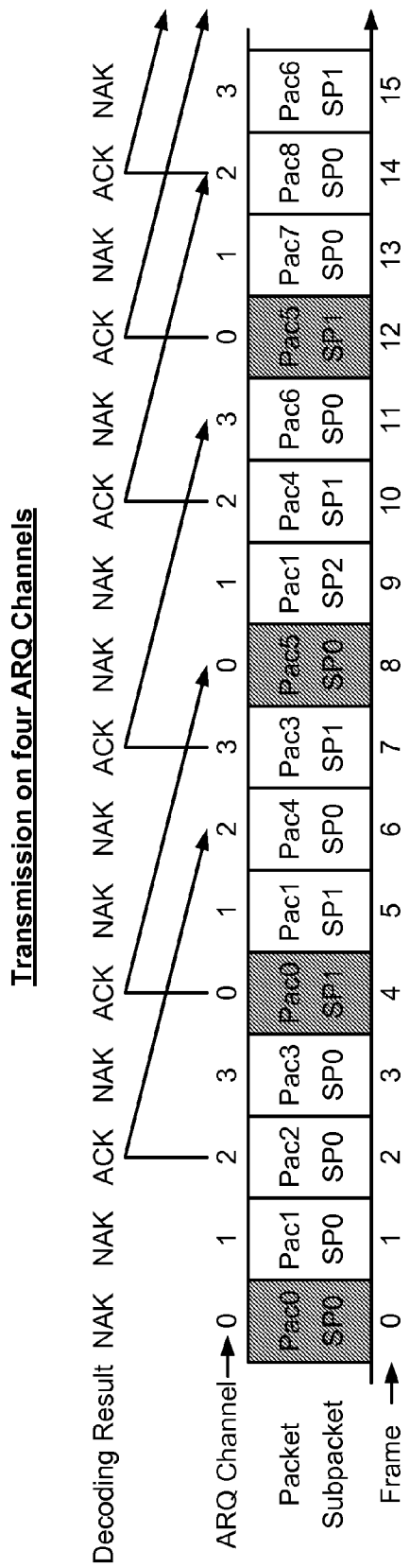
FIG. 3A shows a synchronous HARQ transmission on four ARQ channels.

FIG. 3A shows an exemplary synchronous HARQ transmission on all four ARQ channels. The wireless device sends subpacket 0 of packets 0, 1, 2 and 3 on ARQ channels 0, 1, 2 and 3, respectively, in frames 0, 1, 2 and 3, respectively. The base station receives the four subpackets, decodes packets 0, 1 and 3 in error, and decodes packet 2 correctly. The wireless device then transmits subpacket 1 of packets 0, 1 and 3 on ARQ channels 0, 1 and 3, respectively, in frames 4, 5 and 7, respectively, and transmits subpacket 0 of the next packet 4 on ARQ channel 2 in frame 6. The base station receives the subpackets, decodes packets 0 and 3 correctly, and decodes packets 1 and 4 in error. The wireless device then transmits sub packet 0 of the next packet 5 on ARQ channel 0 in frame 8, subpacket 2 of packet 1 on ARQ channel 1 in frame 9, subpacket 1 of packet 4 on ARQ channel 2 in frame 10, and subpacket 0 of the next packet 6 on ARQ channel 3 in frame 11. The base station receives the subpackets, decodes packets 1, 5 and 6 in error, and decodes packet 4 correctly. The wireless device then transmits subpacket 1 of packet 5 on ARQ channel 0 in frame 12, subpacket 0 of the next packet 7 on ARQ channel 1 in frame 13, subpacket 0 of the next packet 8 on ARQ channel 2 in frame 14, and subpacket 1 of packet 6 on ARQ channel 3 in frame 15. The wireless device transmits a new packet on ARQ channel 1, even though packet 1 has not been decoded, since all three subpackets have been sent for packet 1. The wireless device continues to transmit a new packet whenever an ARQ channel becomes available.

Figure 3B:
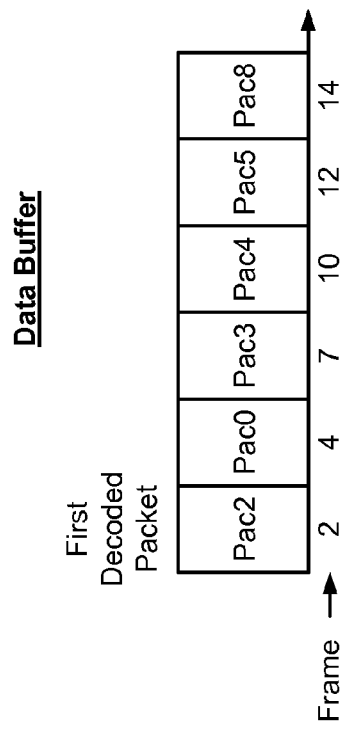
FIG. 3B shows a data buffer for the HARQ transmission shown in FIG. 3A.

FIG. 3B shows the content of a data buffer used to store decoded packets at the base station. The data buffer is commonly called a reordering buffer. Each decoded packet may be temporarily stored in the data buffer until the packet is ready to be sent to upper layers. FIG. 3B shows each decoded packet and the frame in which the packet was decoded. Packet 2 was decoded in frame 2, packet 0 was decoded in frame 4, packet 3 was decoded in frame 7, packet 4 was decoded in frame 10, packet 5 was decoded in frame 12, and packet 8 was decoded in frame 14. Packet 1 is detected to be missing in frame 9. As shown in FIGS. 3A and 3B, although the wireless device transmits the packets starting in sequential order, the base station recovers the packets out of sequence due to the additional transmissions for erased packets.

For simplicity, FIG. 3A assumes no detection errors for the ACKs and NAKs sent by the base station to the wireless device. For each ACK that is detected as a NAK, the wireless device transmits the next subpacket for a packet that is already decoded by the base station. For each NAK that is detected as an ACK, the wireless device transmits the next packet even though the prior packet has not been decoded by the base station. The NAK-to-ACK error rate is typically small (e.g., 0.1%) to achieve reliable data transmission. However, the ACK-to-NAK error rate may be high and variable (e.g., from 1 to 10%). Because of ACK-to-NAK errors, the base station may receive duplicate packets.

The base station may perform duplicate detection to identify and discard duplicate packets. The duplicate detection may be performed based on the following assumptions: (1) the base station (or receiver) has knowledge of the ARQ channel sent in each frame based on system timing; (2) the subpackets for each packet are sent in sequential order, and (3) the base station can only ascertain the SPID of a subpacket if a packet is decoded.

Figure 4:
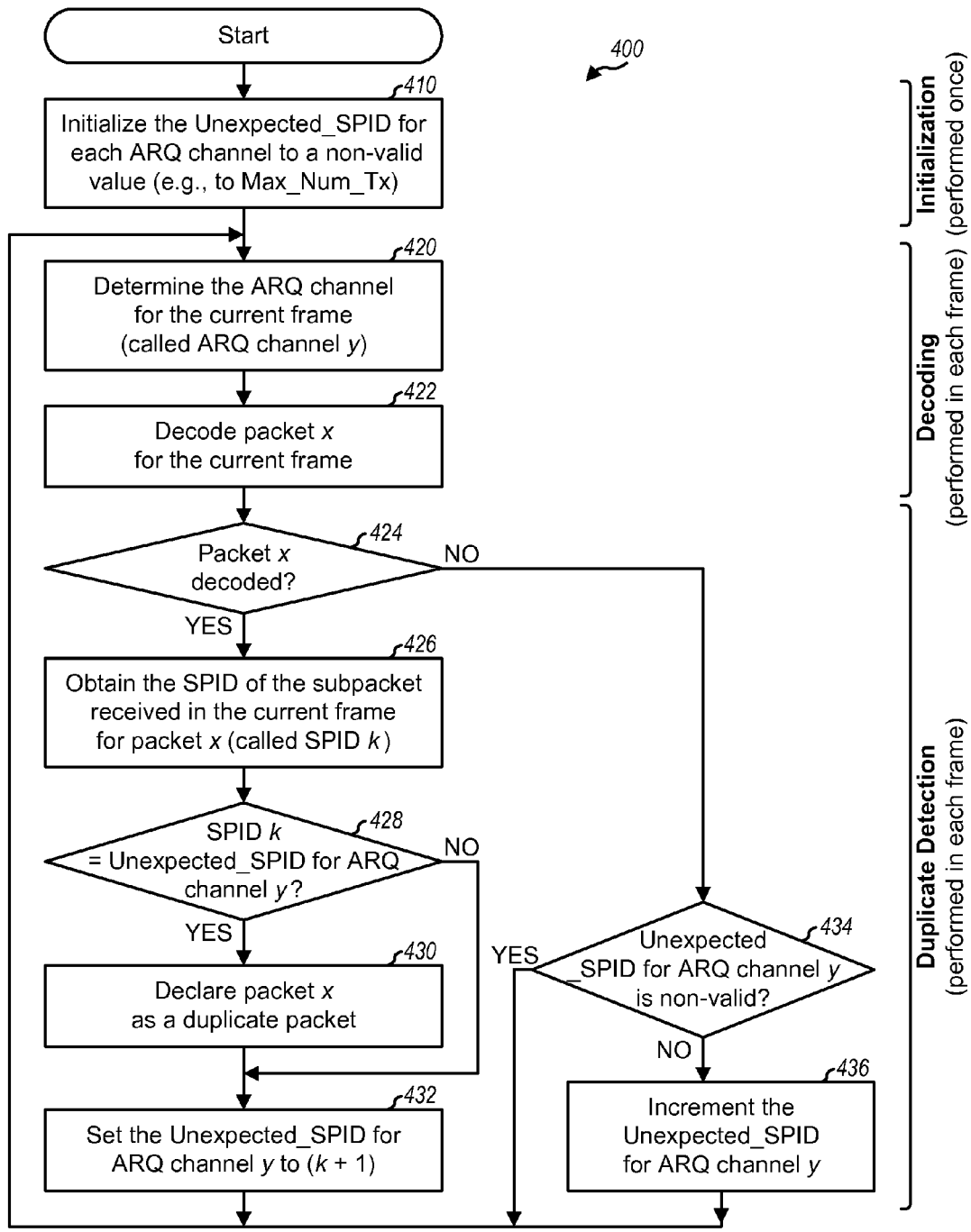
FIG. 4 shows a process for performing duplicate detection.

FIG. 4 shows a flow diagram of a process 400 for performing duplicate detection for packets received via a HARQ transmission. The base station maintains a variable Unexpected_SPID for each ARQ channel. This variable indicates the SPID of a subpacket that is not expected to be received on the ARQ channel. The base station initializes the Unexpected_SPID for each ARQ channel to a non-valid value at the start of the HARQ transmission (block 410). For example, the Unexpected_SPID may be set to Max_Num_Tx, which is the maximum number of subpackets for each packet, where Max_Num_Tx=3 for the R-PDCH in cdma2000 Revision D. The initialization in block 410 is performed once for the HARQ transmission.

The base station performs duplicate detection for each frame with transmission. The base station determines the ARQ channel for the current frame (which is called ARQ channel y) based on its knowledge of system time (block 420). The base station then attempts to decode the packet for the current frame (block 422). A determination is then made whether the packet was decoded (block 424). If the packet was decoded, then the base station obtains the SPID of the subpacket received in the current frame (which is called SPID k) (block 426). For cdma2000 Revision D, each subpacket carries the SPID assigned to the subpacket, but the base station can reliably ascertain the SPID only if the packet is decoded.

The base station then determines whether SPID k is equal to the Unexpected_SPID for ARQ channel y (block 428). If SPID k is not equal to the Unexpected_SPID for ARQ channel y, which would be the case for the first packet sent on ARQ channel y because the Unexpected_SPID was initialized to a non-valid value, then the Unexpected_SPID is set to k+1 (block 432). The base station does not expect to receive a subpacket with a SPID of k+1 in the next frame for ARQ channel y since packet x is already decoded. If a subpacket with a SPID of k+1 is received in the next frame for ARQ channel y, then this subpacket must be sent due to an ACK-to-NAK error and is a duplicate packet. Thus, back in block 428, if SPID k is equal to the Unexpected_SPID, then packet x is declared as a duplicate packet and is discarded (block 430). After block 430, the Unexpected_SPID is set to k+1 (block 432).

If the packet for the current frame was erased, as determined in block 424, then a determination is made whether the Unexpected_SPID for ARQ channel y is non-valid (e.g., equal to Max_Num_Tx) (block 434). If the answer is 'No', then the base station increments the Unexpected_SPID for ARQ channel y by one (block 436). If the answer is 'Yes' for block 434 and also after block 436, the process returns to block 420 to process the next frame.

The duplicate detection in FIG. 4 sets the Unexpected_SPID based on the SPID of the latest subpacket received for a decoded packet. The duplicate detection increments the Unexpected_SPID by one in block 436 (1) whenever an erased packet is received since subpackets are sent in sequential order and (2) if the Unexpected_SPID has not reached Max_Num_Tx and is not the non-valid value assigned in block 410. If the Unexpected_SPID reaches Max_Num_Tx in block 436, then the Unexpected_SPID may be maintained at Max_Num_Tx or set to some other non-valid value. The duplicate detection may also be performed in other manners based on the description herein.

As shown in FIGS. 3A and 3B, the receiver HARQ entity at the base station may recover packets out of sequence even though these packets may be sent in sequential order. It is desirable to forward each decoded packet to the upper layers as soon as possible to reduce delays. However, if the upper layers expect to receive packets in sequential order, then the receiver HARQ entity typically buffers the decoded packets, re-orders packets that are out of sequence, and then provides the re-ordered packets to the upper layers.

For a given decoded packet x, the base station can forward packet x to the upper layers if no packet was sent before packet x and may still be received. Another packet b is sent before packet x if the transmission of packet b started before the transmission of packet x. If packets are sent in sequential order, then if another packet b was sent before packet x, then packet b should be forwarded to the upper layers prior to packet x if the upper layers expect to receive packets in sequential order. If packet b is not decoded after the maximum possible number of ARQ re-transmissions, then packet b is lost and packet x may be forwarded to the upper layers.

The base station may maintain a flag for each ARQ channel and may clear this flag for packet x if there are no pending earlier packets on the ARQ channel. A pending earlier packet is a packet that is sent on an ARQ channel before packet x and which may still be received by the base station. The base station may forward packet x to the upper layers if the flags for all of the ARQ channels are cleared. Table 1 lists various variables used in the description below and a short description for each variable. Default values for some of the variables are given in the third column of Table 1 for the R-PDCH in cdma2000.

TABLE 1

| Variable | Description | Default |
|---|---|---|
| Num_Channels | Number of ARQ channels available for data transmission. | 4 |
| Max_Num_Tx | Maximum number of subpackets for each packet. | 3 |
| Max_Wait | Maximum amount of time (in frames) to wait for a packet on another ARQ channel. | 8 frames |
| Current_Frame | The current frame being processed. | |
| Start_Time | The time at which a packet is first transmitted. Start_Time is maintained for each packet and is given in units of frames. | |
| Last_Decode_Time | The time at which a decoded packet was last received on an ARQ channel. Last_Decode_Time is maintained for each ARQ channel and is given in units of frames. | |

For synchronous HARQ, the Max_Wait may be computed as follows:

$$\text{Max\_Wait} = \text{Num\_Channels} \times (\text{Max\_Num\_Tx} - 1). \quad \text{Eq (1)}$$

Max_Wait=8 frames for the R-PDCH in cdma2000 Revision D. It is possible to have autonomous transmissions on the R-PDCH for synchronous HARQ.

For asynchronous HARQ, each transmission on the R-PDCH may be scheduled. The Max_Wait for an ARQ channel is the time between the first and the last subpacket transmission on that ARQ channel and may have a variable duration. The Max_Wait for each ARQ channel is known to the receiver if the scheduling entity resides at the receiver. This is true for completely scheduled reverse links such as IEEE 802.16. If the scheduling entity is at the transmitter, then the Max_Wait for an ARQ channel can be determined if the transmitter has a reliable way for transmitting the subpacket and ARQ channel identifier to the receiver.

For each ARQ channel z, where z∈C and C denotes the set of all ARQ channels, the base station may clear the flag for ARQ channel z if either one of the following two conditions is met:

1. A packet was sent on ARQ channel z after the Start_Time for packet x or, equivalently, the Last_Decode_Time for ARQ channel z is later than the Start_Time for packet x minus Num_Channels;
2. At least (Max_Num_Tx−1) subpackets have been sent on ARQ channel z since the Start_Time for packet x.

For an unscheduled but synchronous HARQ transmission, the number of subpackets that have been sent on an ARQ channel can be determined from the time elapsed since last decoding. For a scheduled HARQ transmission, whether synchronous or asynchronous, the receiver is aware of the subpacket being scheduled. In that case, the receiver knows when (Max_Num_Tx−1) are sent on each ARQ channel.

Conditions 1 and 2 are described in detail below for synchronous HARQ where each consecutive subpacket on an ARQ channel is sent after a fixed delay. This simplifies the timing description of the algorithm given below. The algorithm may also be used for asynchronous HARQ if the receiver knows the Start_Time of each ARQ channel.

Figure 5A:
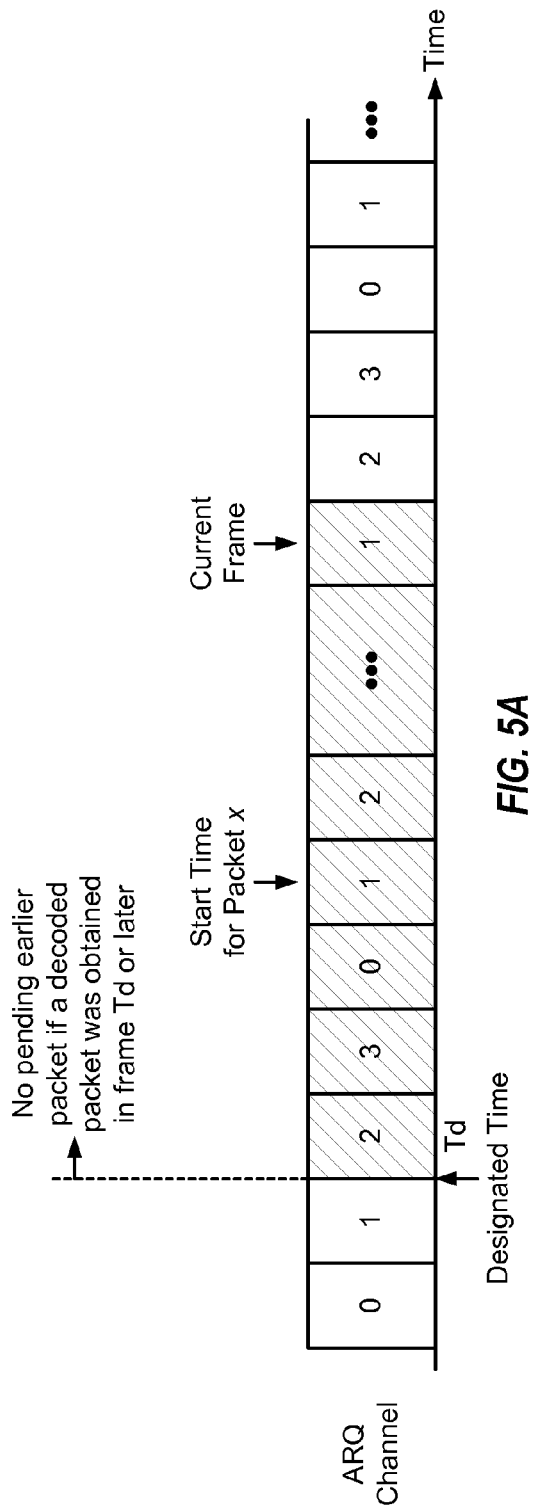
FIGS. 5A and 5B illustrate two conditions for determining whether an earlier packet is still pending on another ARQ channel.

FIG. 5A shows the clearing of the flags for the ARQ channels based on the first condition. For the example shown in FIG. 5A, packet x is sent on ARQ channel y=1 starting at the Start_Time shown in FIG. 5A and is decoded in the current frame. All of the frames starting after Start_Time−4 (which is the designated time, and is equal to Start_Time−Num_Channels) up to the current frame are shown by diagonal hashing. If a packet for any ARQ channel z was decoded in any one of the frames with hashing, then any packet that may be sent after this decoded packet on the same ARQ channel z would have a start time later than the Start_Time for packet x. Hence, this ARQ channel z cannot carry an earlier packet than packet x, and the flag for this ARQ channel z may be cleared. The inclusion of frame Start_Time−4 for the first condition is optional as decoding packet x at time allows the flag for ARQ channel y to be cleared for packet x.

Figure 5B:
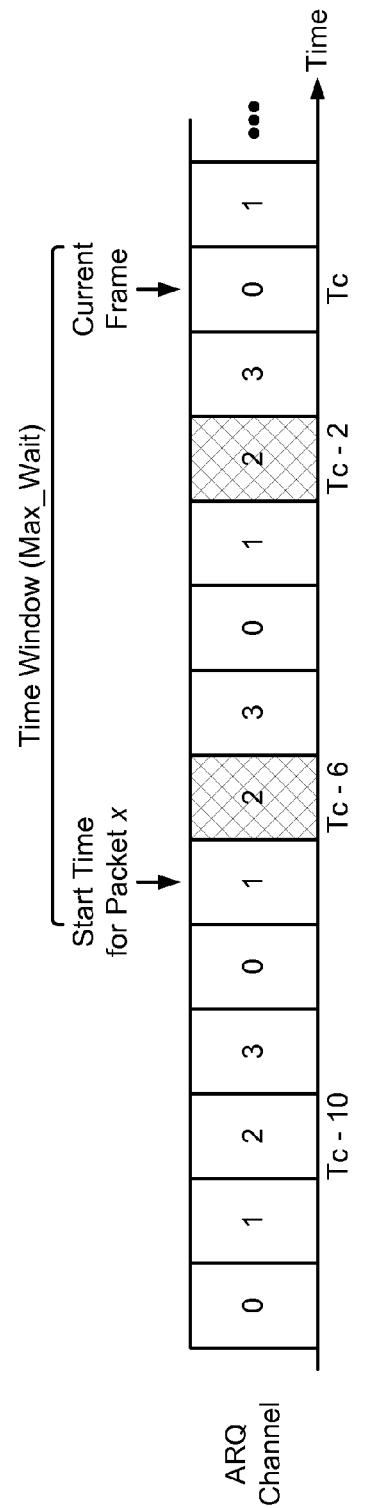

FIG. 5B shows the clearing of the flags for the ARQ channels based on the second condition. For the example shown in FIG. 5B, Max_Num_Tx=3 and up to three subpackets are sent for each packet. Packet x is sent on ARQ channel y=1 starting at the Start_Time shown in FIG. 5B and is decoded correctly in frame Tc−3, which is four frames after the Start_Time for packet x. An ARQ channel z that has carried Max_Num_Tx−1 subpackets since the Start_Time for packet x cannot carry a packet that was sent before the Start_Time for packet x. For example, ARQ channel z=2 carries a subpacket in frame Tc−2, which is two frames prior to the current frame, and another subpacket in frame Tc−6, which is six frames prior to the current frame. Both subpackets are sent on ARQ channel 2 after the Start_Time for packet x. After processing the subpacket for ARQ channel 2 in frame Tc−2, it is not possible that ARQ channel 2 still carries a packet that was sent before the Start_Time for packet x. This is because if a packet was sent on ARQ channel 2 before the Start_Time for packet x, then this packet would have to be sent starting at frame Tc−10 and would be finished at frame Tc−2, regardless of whether the packet was decoded or erased, because the maximum number of subpackets have been sent for the packet. For the second condition, the flag for each ARQ channel z may be cleared if no packet was decoded for ARQ channel z within the last Num_Wait frames from the current frame, which may be viewed as a sliding time window. The above example would be equally applicable if packet x were decoded in frame Tc−7 instead of frame Tc−3.

Figure 6:
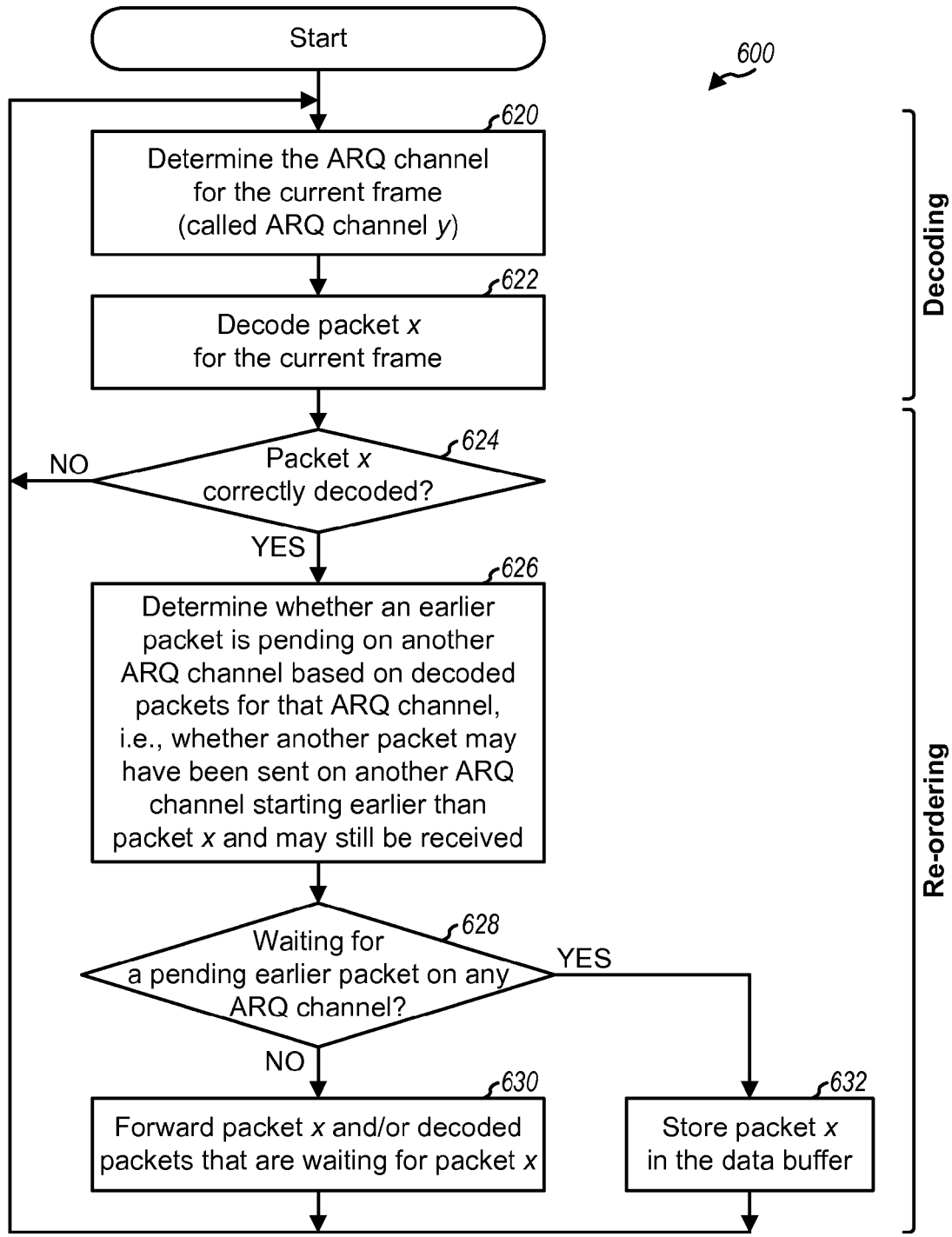
FIG. 6 shows a process for re-ordering packets.

FIG. 6 shows a flow diagram of a process 600 for re-ordering packets received via a HARQ transmission. The base station performs reordering for each frame with transmission. The base station determines the ARQ channel for the current frame (which is called ARQ channel y) (block 620). The base station then attempts to decode packet x for the current frame (block 622). A determination is then made whether packet x was decoded (block 624). If packet x was decoded, then the base station determines whether another packet may have been sent on another ARQ channel before packet x and may still be received, i.e., whether there is an earlier packet that is still pending on another ARQ channel (block 626). If there is a pending earlier packet and the base station needs to wait for this packet, as determined in block 628, then the base station stores packet x in the data buffer (block 632). Otherwise, if there are no pending earlier packets, then the base station forwards packet x and/or all packets that have been decoded and are waiting for packet x (block 630). There may be cases in which packet x cannot be forwarded, but the decoding of packet x allows other packets waiting in the data buffer to be forwarded. The process then returns to block 620 to process the next frame.

Figure 7:
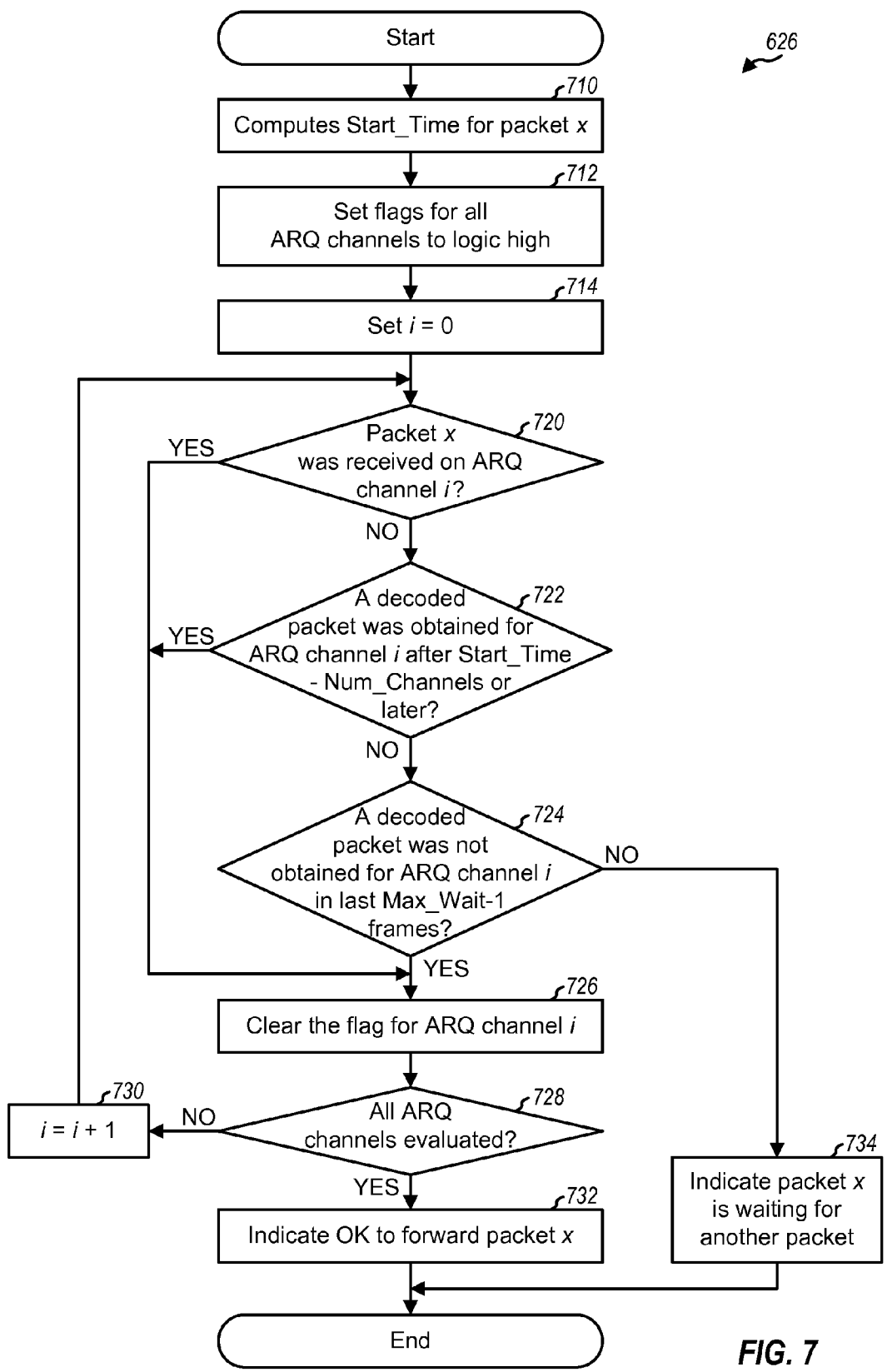
FIG. 7 shows a process for determining whether there is a pending earlier packet.

FIG. 7 shows a flow diagram of an embodiment of block 626 in FIG. 6. Initially, the Start_Time for packet x is computed as described below (block 710), and the flags for all of the ARQ channels are set to logic high (block 712). An index i for the ARQ channels is set to zero for the first ARQ channel to be evaluated (block 714). A determination is then made whether packet x, which was decoded in the current frame, was received on ARQ channel i (block 720). If the answer is 'Yes' for block 720, then the flag for ARQ channel i is cleared (block 726). Otherwise, a determination is made whether a decoded packet was obtained for ARQ channel i after Start_Time−Num_Channels, where Start_Time is the start time for packet x (block 722). If the answer is 'Yes' for block 722, then the flag for ARQ channel i is cleared (block 726). Otherwise, a determination is made whether no decoded packet was obtained for ARQ channel i in the last Max_Wait−1 frames (block 724). If the answer is 'Yes' for block 724, then the flag for ARQ channel i is cleared (block 726).

Blocks 720 and 722 are for the first condition described above in FIG. 5A, which is shown as two separate blocks in FIG. 7 for clarity. Block 724 is for the second condition described above in FIG. 5B. If the answer is 'No' for all three blocks 720, 722, and 724, then there is at least one pending packet that was sent before packet x and which may still be received. An indication is then provided that packet x is waiting for another packet (block 734), and the processing for block 626 terminates.

If the flag for ARQ channel i is cleared in block 726 because there is no pending earlier packet on this ARQ channel, then a determination is made whether all ARQ channels have been evaluated (block 728). If the answer is 'No', then the index i is incremented (block 730) and the process returns to block 720 to evaluate the next ARQ channel. Otherwise, if the answer is 'Yes' for block 728, which means that the flags for all ARQ channels have been cleared, then an indication is provided that packet x may be forwarded to upper layers (block 732), and the processing for block 626 terminates.

A specific embodiment for processing packets and performing re-ordering is described below. For this embodiment, a single variable Last_Decode_Time is maintained for each ARQ channel and is used to evaluate both conditions 1 and 2 for the ARQ channel. The Last_Decode_Time for each ARQ channel indicates the frame in which a decoded packet was last obtained for the ARQ channel and is set to the current frame (or Current_Frame) whenever a decoded packet is obtained on the ARQ channel. The Last_Decode_Time for each ARQ channel is also set to be no earlier than Current_Frame−Max_Wait whenever the ARQ channel is processed, so that condition 2 may be evaluated with the same variable. At the start of the HARQ transmission, the Last_Decode_Time for ARQ channels 0, 1, 2, and 3 is initialized to First_Frame−4, First_Frame−3, First_Frame−2, and First_Frame−1, respectively, where First_Frame is the frame in which the very first subpacket is sent for the HARQ transmission.

Figure 8:
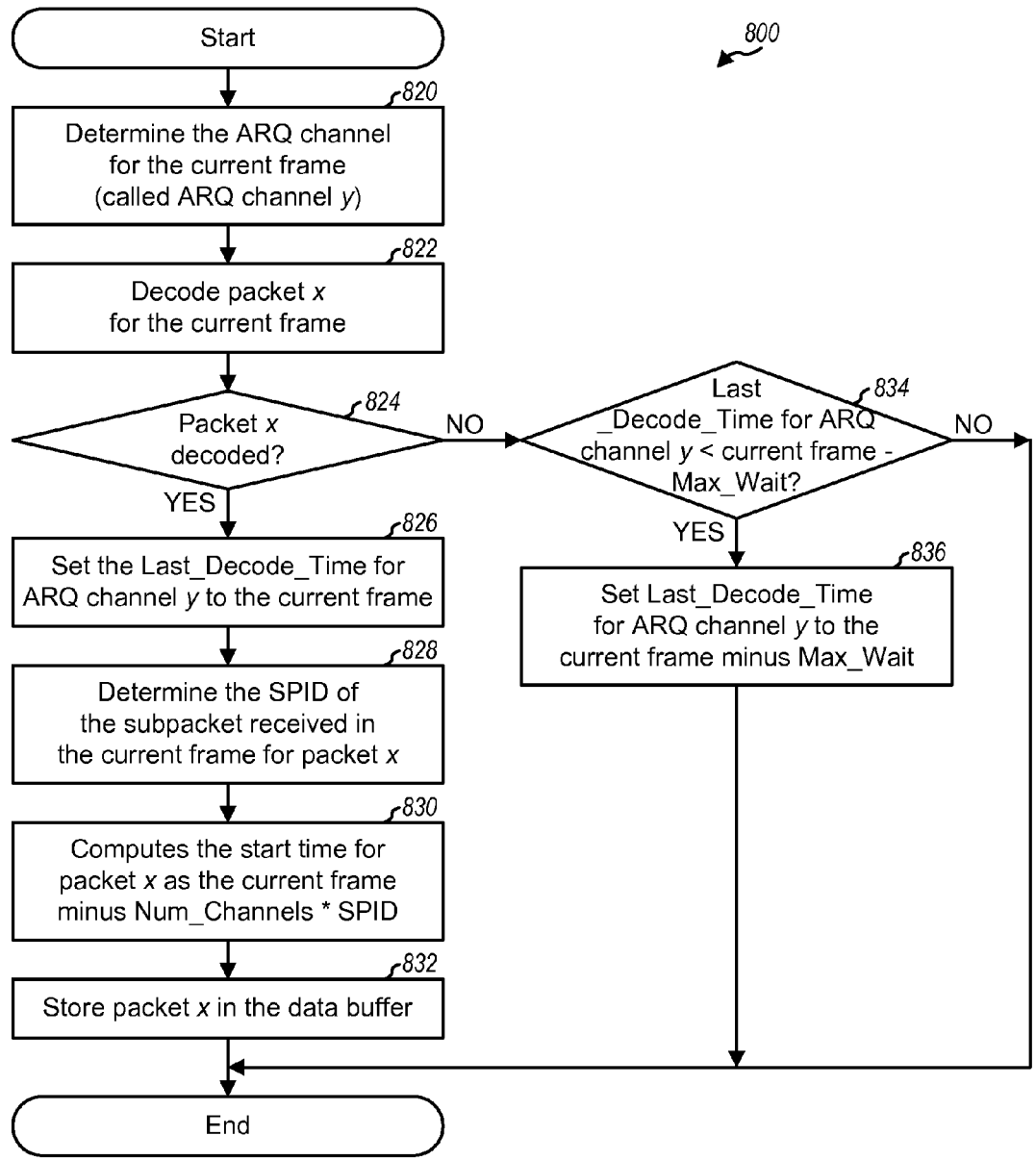
FIG. 8 shows a process for processing received packets for a HARQ transmission.

FIG. 8 shows a flow diagram of a process 800 for processing packets received for a HARQ transmission. Process 800 is performed for each frame with transmission. The base station determines the ARQ channel for the current frame, which is called ARQ channel y (block 820), decodes packet x for the current frame (block 822), and determines whether packet x was decoded (block 824). If packet x was decoded, then the base station sets the Last_Decode_Time for ARQ channel y to the Current_Frame (block 826), determines the SPID of the subpacket received in the current frame for packet x (block 828), and computes the Start_Time for packet x (block 830), as follows:

$$Start\_Time = Current\_Frame - Num\_Channels \times SPID. \qquad Eq\ (2)$$

The start time for each packet is ascertained only if the packet is decoded and is further computed based on the number of subpackets that have been transmitted for the packet, which is indicated by the SPID of the subpacket received in the current frame for packet x. Packet x is then stored in the data buffer along with its Start_Time (block 832).

If packet x was erased, as determined in block 824, then the base station determines whether the Last_Decode_Time for ARQ channel y is earlier than Max_Wait from the current frame (block 834). If the answer is 'Yes', then the base station sets the Last_Decode_Time for ARQ channel y (block 836), as follows:

$$Last\_Decode\_Time = Current\_Frame - Max\_Wait. \qquad Eq\ (3)$$

If the answer is 'No' for block 834, and also after blocks 832 and 836, the process terminates.

Figure 9:
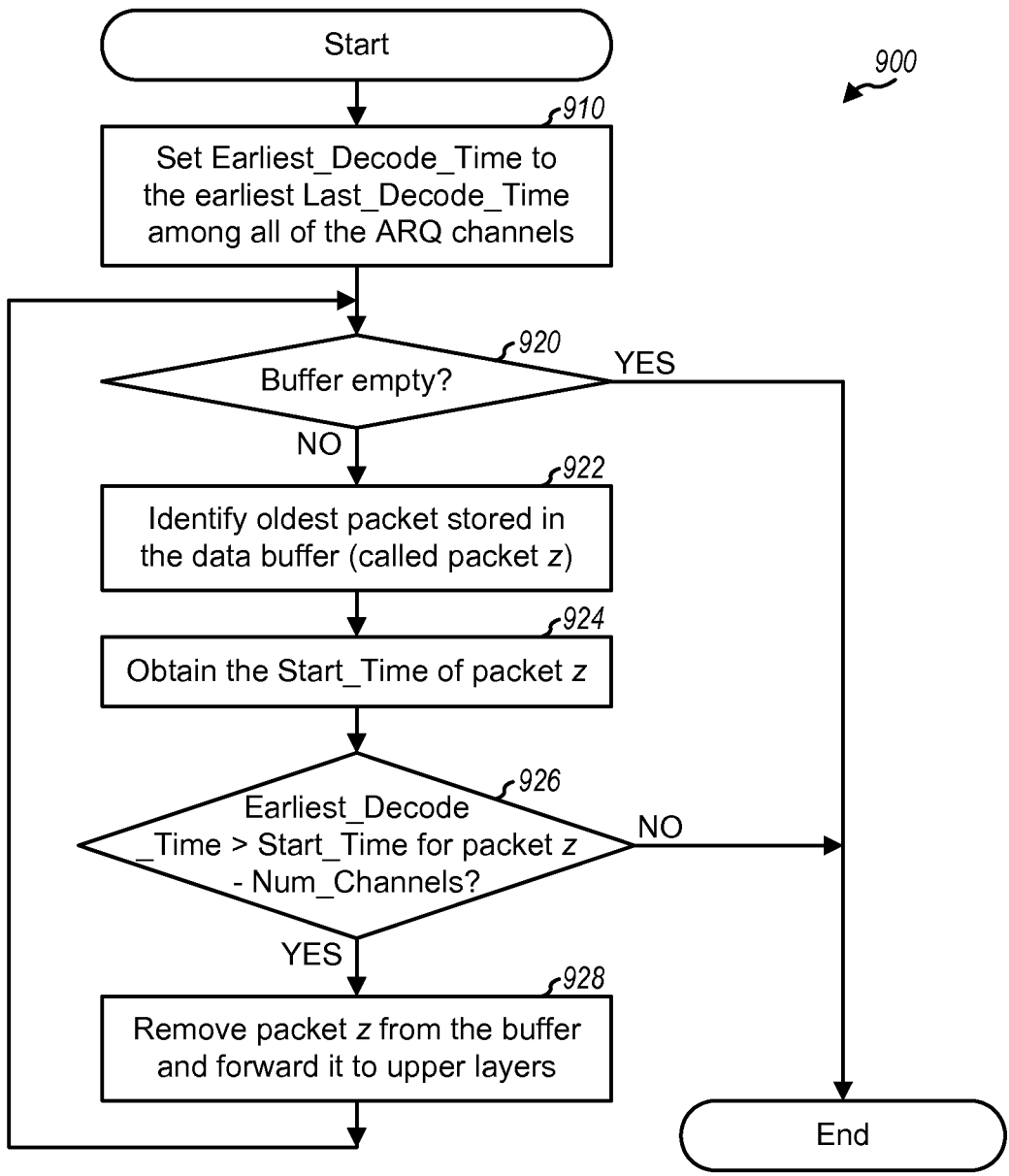
FIG. 9 shows a process for reordering and forwarding packets to upper layers.

FIG. 9 shows a flow diagram of a process 900 for re-ordering and forwarding packets to upper layers. Process 900 may be performed after process 800 and whenever a decoded packet is obtained on an ARQ channel. A variable Earliest_Decode_Time is set to the earliest Last_Decode_Time among all of the ARQ channels, (block 910).

A determination is then made whether the data buffer is empty (block 920). If the answer is 'Yes', then the process terminates. Otherwise, the oldest packet stored in the data buffer is identified (which is called packet z) (block 922). Packet z has the earliest start time among all of the packets stored in the data buffer. The decoded packets may be stored in the data buffer sorted based on their start times. For example, the packet with the oldest start time may be stored at the top of the buffer, followed by the packet with the next oldest start time, and so on. In any case, the Start_Time of packet z is obtained (block 924).

A determination is then made whether the Earliest_Decode_Time is later than the Start_Time of packet z minus Num_Channels (block 926). As shown in FIG. 5A, if a decoded packet was obtained for another ARQ channel z in frame Start_Time-Num_Channels or later, then ARQ channel z is not carrying a pending earlier packet. Since packet x is only forwarded if there are no pending earlier packets on any ARQ channel, the use of the Earliest_Decode_Time effectively evaluates condition 1 for all of the ARQ channels with a single comparison in block 926. Furthermore, by setting the Last_Decode_Time for each ARQ channel to be no later than Current_Frame-Max_Wait in block 836 in FIG. 8, condition 2 is also evaluated by the comparison in block 926.

If the answer is 'Yes' for block 926, which indicates that there are no pending earlier packets, then packet z is removed from the data buffer and forwarded to the upper layers (block 928). The process then returns to block 920 to evaluate the oldest packet (if any) in the data buffer. Otherwise, if the answer is 'No' for block 926, which indicates that there is at least one pending earlier packet, then packet z is retained in the data buffer and the process is terminated.

Figure 10:
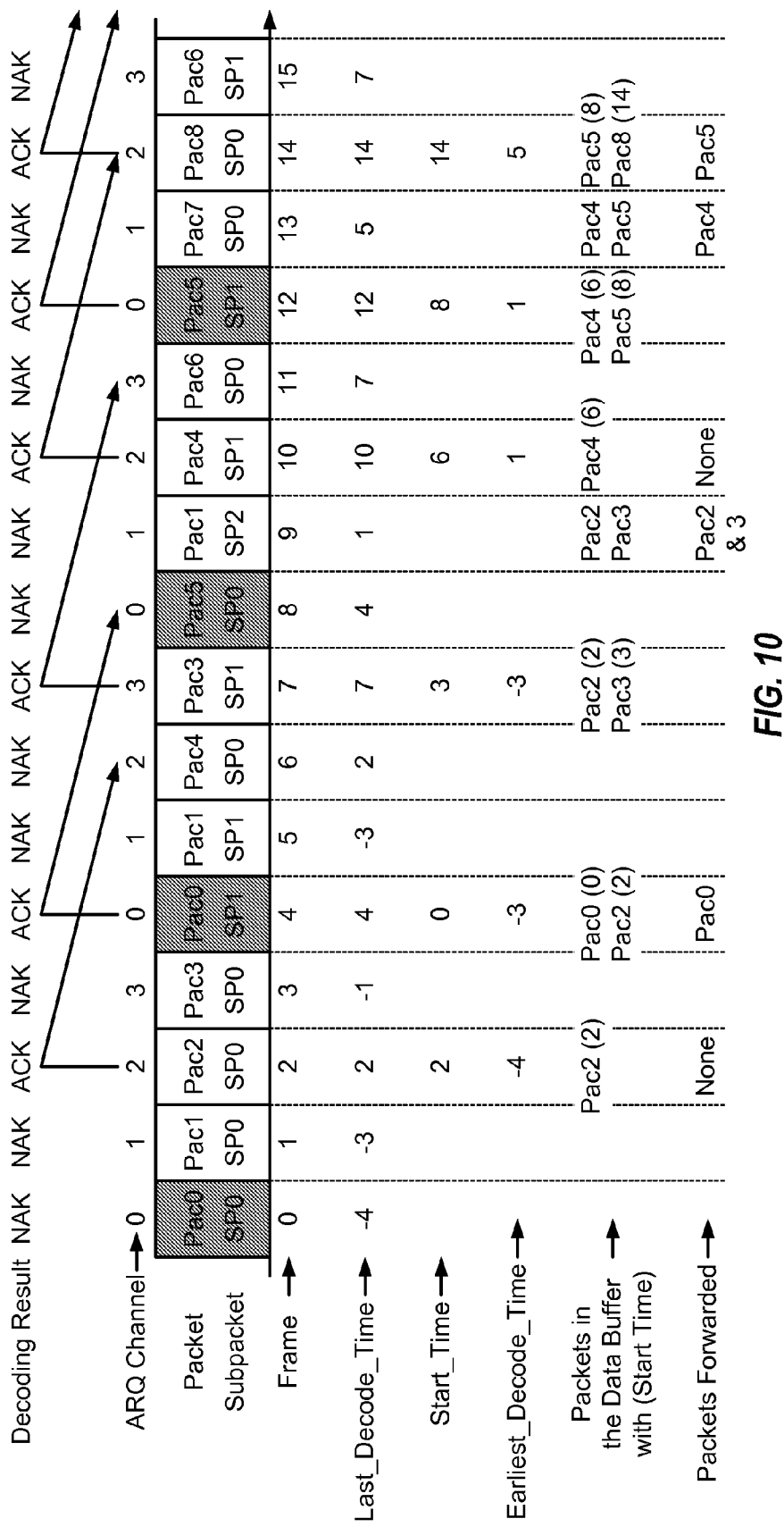
FIG. 10 illustrates processing for the HARQ transmission shown in FIG. 3A.

FIG. 10 shows the processing for the exemplary HARQ transmission in FIG. 3A using processes 800 and 900 in FIGS. 8 and 9, respectively. The first subpacket transmission occurs in frame 0, and the Last_Decode_Time for ARQ channels 0, 1, 2, and 3 is initialized to −4, −3, −2 and −1, respectively, at the start of the HARQ transmission. The Last_Decode_Time for each ARQ channel is updated whenever that ARQ channel is processed. This updating entails setting the Last_Decode_Time to (1) the current frame if a decoded packet is obtained for the ARQ channel, which is the case for frames 2, 4, 7, 10, 12 and 14 in FIG. 10, and (2) the current frame minus Max_Wait if the Last_Decode_Time is later than this value, which is the case for frames 9, 13, and 15. The base station re-orders and forwards packets whenever a decoded packet is obtained, e.g., in frames 2, 4, 7, 9, 10, 12, 13 and 14 in FIG. 10. For each frame with a decoded packet, FIG. 10 shows (1) the Earliest_Decode_Time computed for the frame, (2) the packets stored in the data buffer and the start time for each stored packet, which is given within parentheses, and (3) the packets, if any, that are forwarded to the upper layers. For the example shown in FIG. 10, packet 4 in frame 10 is held up because a packet has not been decoded on ARQ channel 1. If the packet sequence number is available for re-ordering, then packet 4 may be forwarded if packet 3 has already been forwarded.

Exemplary pseudo-codes for processes 800 and 900 in FIGS. 8 and 9, respectively, are shown below.

Updating the Variables:

```
100   If (CRC for Packetx on ACIDy passes) Then {
110       Last_Decode_Time[ACIDy] = Sys_Time;
120       Start_Time[Packetx] = Sys_Time - 4*SPID[Packetx];
130       Put Packetx in Buffer sorted based on
              increasing values of packet Start_Time; }
140   Else {
150       Last_Decode_Time[ACIDy] = max(Last_Decode_Time[ACIDy],
              Sys_Time - 4*(Max_Num_Tx-1)); }
```

Re-ordering and Forwarding Packets:

```
200   eval_next_packet = true;
210   Earliest_Decode_Time = min{Last_Decode_Time[ACID0],
          Last_Decode_Time[ACID1], Last_Decode_Time[ACID2],
          Last_Decode_Time[ACID3]};
220   While ((eval_next_packet==true) && (Buffer not empty)) do
230   {
240       Next_Packet = Get oldest packet from Buffer
250       If (Earliest_Decode_Time > Start_Time[Next_Packet] - 4)
260           Then forward Next_Packet to upper layers
270           Else eval_next_packet = false;
280   }
```

Figure 11:
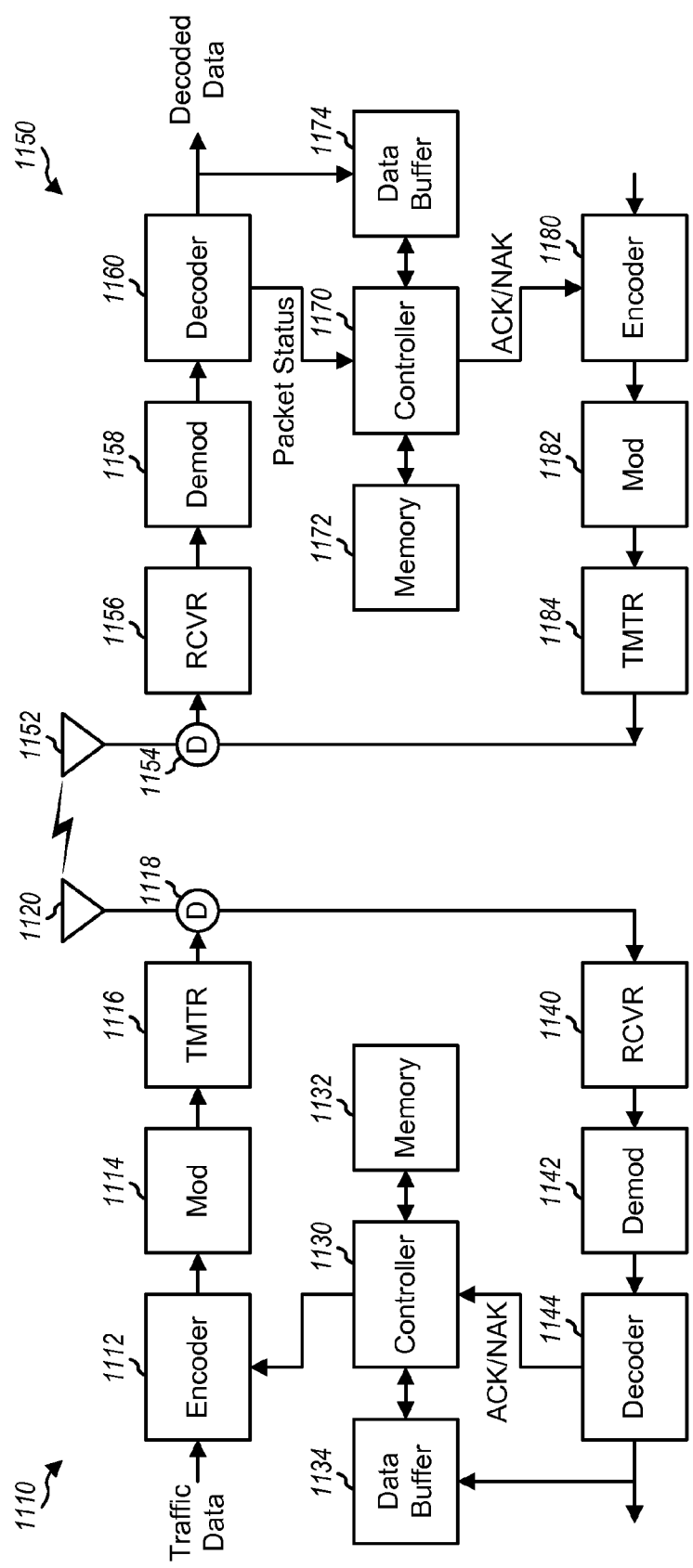
FIG. 11 shows a block diagram of a wireless device and a base station.

FIG. 11 shows a block diagram of an embodiment of a wireless device 1110 and a base station 1150 in a wireless communication system. A wireless device may also be called a mobile station, a user/access terminal, a user equipment, a handset, a subscriber unit, or some other terminology. A base station is a fixed station and may also be called a base transceiver station (BTS), an access point, a Node B, or some other terminology.

For the reverse link, an encoder 1112 receives traffic data to be sent by wireless device 1110 for a HARQ transmission and processes each data packet to generate a corresponding coded packet. Encoder 1112 may further partition each coded packet into multiple subpackets. The processing by encoder 1112 may include formatting, encoding, interleaving, and so on, and is determined by the applicable standard for the system. For example, the data may be sent on the R-PDCH and the processing may be performed in accordance with cdma2000 Revision D. A modulator (Mod) 1114 receives the subpackets and processes each subpacket for transmission. The processing by modulator 1114 may include symbol mapping, channelization, spectral spreading, and so on, and is also determined by the applicable standard for the system. A transmitter unit (TMTR) 1116 processes the output from modulator 1114 and generates a reverse link signal, which is routed through a duplexer (D) 1118 and transmitted via an antenna 1120.

At base station 1150, the reverse link signal is received by an antenna 1152, routed through a duplexer 1154, and processed by a receiver unit (RCVR) 1156 to generate received samples. A demodulator (Demod) 1158 then processes (e.g., despreads, dechannelizes, and data demodulates) the received samples and provides demodulated symbols. A decoder 1160 decodes the demodulated symbols for each packet sent by wireless device 1110, checks the packet, provides the status of the packet to a controller 1170, and provides the packet (if decoded) to a data buffer 1174. The processing by demodulator 1158 and decoder 1160 at base station 1150 is complementary to the processing by modulator 1114 and encoder 1112, respectively, at wireless device 1110.

Encoder 1112 and decoder 1160 perform processing for the physical layer. HARQ is typically implemented at a Medium Access Control (MAC) layer that resides on top of the physical layer. In one embodiment, encoder 1112 implements all or a part of a transmitter HARQ entity for the HARQ transmission from wireless device 1110 to base station 1150. Decoder 1160 implements all or a part of a receiver HARQ entity for the HARQ transmission. In another embodiment, a controller 1130 implements all or a part of the transmitter HARQ entity, and controller 1170 implements all or a part of the receiver HARQ entity. For example, decoder 1160 may provide the status of each received packet and the decode time for each decoded packet, and controller 1170 may perform duplicate detection, re-ordering, and forwarding of decoded packets to the upper layers. Controller 1170 may further provide the appropriate ACK/NAK feedback for each subpacket received from wireless device 1110.

For the forward link, data to be sent by base station 1150 and the ACK/NAK for wireless device 1110 are processed (e.g., formatted, encoded, and so on) by an encoder 1180, further processed (e.g., channelized, spread, and so on) by a modulator 1182, and conditioned by a transmitter unit 1184 to generate a forward link signal, which is routed through duplexer 1154 and transmitted via antenna 1152. At wireless device 1110, the forward link signal is received by antenna 1120, routed through duplexer 1118, and processed by a receiver unit 1140 to generate input samples. A demodulator 1142 processes the input samples and provides demodulated symbols, and a decoder 1144 further processes the demodulated symbols and provides decoded data to a data buffer 1134.

Controller 1130 receives from decoder 1144 the ACK/NAK feedback sent by base station 1150 and directs transmission of subpackets for erased and new packets. Controllers 1130 and 1170 further direct the operation of various processing units at wireless device 1110 and base station 1150, respectively. Controllers 1130 and 1170 may implement all or a portion of the duplicate detection and reordering techniques described herein for HARQ transmission on the forward link and reverse link, respectively. For example, each controller may implement the processes shown in FIGS. 4, 6, 7, 8 and 9. Memory units 1132 and 1172 store program codes and data used by controllers 1130 and 1170, respectively.

For clarity, the duplicate detection and re-ordering techniques have been described for the R-PDCH in cdma2000 Revision D. In general, these techniques may be used for HARQ with any number of ARQ channels, any number of subpackets/transmissions for each packet, and so on.

The duplicate detection and reordering techniques described herein may be implemented by various means. For example, these techniques may be implemented in hardware, software, or a combination thereof. For a hardware implementation, the processing units used to perform duplicate detection and/or re-ordering may be implemented within one or more application specific integrated circuits (ASICs), digital signal processors (DSPs), digital signal processing devices (DSPIDs), programmable logic devices (PLDs), field programmable gate arrays (FPGAs), processors, controllers, micro-controllers, microprocessors, other electronic units designed to perform the functions described herein, or a combination thereof.

For a software implementation, the duplicate detection and re-ordering techniques may be implemented with modules (e.g., procedures, functions, and so on) that perform the functions described herein. The software codes may be stored in a memory unit (e.g., memory unit 1132 or 1172 in FIG. 11) and executed by a processor (e.g., controller 1130 or 1170). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments, without departing from the spirit or scope of the invention. Thus, the present invention is not intended to be limited to the embodiments shown herein but is to be accorded the widest scope consistent with the principles and novel features disclosed herein.

What is claimed is:

1. A method of performing re-ordering for a hybrid automatic repeat request (HARQ) transmission, comprising:
    obtaining a decoded packet for one of a plurality of ARQ channels;
    determining upon obtaining the decoded packet and based at least in part on packet timing on each of the plurality of ARQ channels whether an earlier packet is still pending on any one other of the plurality of ARQ channels based on decoded packets for the any one other of the plurality of ARQ channels, each pending earlier packet being a packet that was sent before the decoded packet and may still be received; and
    forwarding the decoded packet if there are no pending earlier packets.

2. The method of claim 1, further comprising:
    storing the decoded packet if there is at least one pending earlier packet.

3. The method of claim 1, wherein the determining whether an earlier packet is still pending on any one other of the plurality of ARQ channels comprises
for each other of the plurality of ARQ channels, indicating there are no pending earlier packets if a decoded packet was received on the other one of the plurality of ARQ channels at a designated time or later.

4. The method of claim 3, further comprising:
determining the designated time based on a start time for the decoded packet and number of the plurality of ARQ channels available for the HARQ transmission.

5. The method of claim 1, wherein the determining whether an earlier packet is still pending on any one of the at least one other of the plurality of ARQ channels comprises
for each of the at least one other of the plurality of ARQ channels, indicating there are no pending earlier packets if a decoded packet was not received on the other of the plurality of ARQ channels within a time window.

6. The method of claim 5, further comprising:
determining the time window based a maximum number of subpackets for each packet and number of the plurality of ARQ channels available for the HARQ transmission.

7. The method of claim 1, wherein the determining whether an earlier packet is still pending on any one other of the plurality of ARQ channels comprises
determining a last decode time for each of the at least one other of the plurality of ARQ channels,
determining an earliest last decode time for the at least one other of the plurality of ARQ channels, and
determining whether an earlier packet is still pending on any one other of the plurality of ARQ channels based on the earliest last decode time.

8. The method of claim 7, wherein the determining the last decode time for each of the at least one other of the plurality of ARQ channels comprises
setting the last decode time for each of the at least one other of the plurality of ARQ channels to be within a time window from a time at which the one other of the plurality of ARQ channels is received.

9. The method of claim 3, further comprising:
receiving the HARQ transmission via the plurality of ARQ channels that include the one of the plurality of ARQ channels and the any one other of the plurality of ARQ channels, the plurality of ARQ channels being sent in a predetermined order on a time line.

10. An apparatus for receiving a hybrid automatic repeat request (HARQ) transmission in a wireless communication system, comprising:
a decoder to provide a decoded packet for one of a plurality of ARQ channels; and
a controller to determine upon obtaining the decoded packet and based at least in part on packet timing on each of the plurality of ARQ channels whether an earlier packet is still pending on any one other of the plurality of ARQ channels based on decoded packets for the at least any one other of the plurality of ARQ channels and to forward the decoded packet if there are no pending earlier packets for the decoded packet, each pending earlier packet being a packet that was sent before the decoded packet and may still be received.

11. The apparatus of claim 10, wherein for each other of the plurality of ARQ channels, the controller indicates no pending earlier packets if a decoded packet was received on the other one of the plurality of ARQ channels at a designated time or later, the designated time being determined based on a start time for the decoded packet and number of the plurality of ARQ channels available for the HARQ transmission.

12. The apparatus of claim 10, wherein for each of the at least one other of the plurality of ARQ channels, the controller indicates no pending earlier packets if a decoded packet was not received on the other of the plurality of ARQ channels within a time window determined based on a maximum number of subpackets for each packet and number of the plurality of ARQ channels available for the HARQ transmission.

13. The apparatus of claim 10, further comprising:
a buffer to store the decoded packet if there is at least one pending earlier packet.

14. The apparatus of claim 10, wherein the decoder decodes packets received on a Reverse Packet Data Channel (R-PDCH) in cdma2000.

15. An apparatus for receiving a hybrid automatic repeat request (HARQ) transmission in a wireless communication system, comprising:
means for obtaining a decoded packet for one of a plurality of ARQ channels;
means for determining upon obtaining the decoded packet and based at least in part on packet timing on each of the plurality of ARQ channels whether an earlier packet is still pending on any one other of the plurality of ARQ channels based on decoded packets for the any one other of the plurality of ARQ channels, each pending earlier packet being a packet that was sent before the decoded packet and may still be received; and
means for forwarding the decoded packet if there are no pending earlier packets.

16. The apparatus of claim 15, wherein the means for determining whether an earlier packet is still pending on any one other of the plurality of ARQ channels comprises
means for indicating there are no pending earlier packets for each other of the plurality of ARQ channels if a decoded packet was received on the other one of the plurality of ARQ channels at a designated time or later, the designated time being determined based on a start time for the decoded packet and number of the plurality of ARQ channels available for the HARQ transmission.

17. The apparatus of claim 15, wherein the means for determining whether an earlier packet is still pending on any one of the at least one other of the plurality of ARQ channels comprises
means for indicating there are no pending earlier packets for each of the at least one other of the plurality of ARQ channels if a decoded packet was not received on the other of the plurality of ARQ channels within a time window determined based on a maximum number of subpackets for each packet and number of the plurality of ARQ channels available for the HARQ transmission.

18. A processor readable media for storing instructions operable to:
obtain a decoded packet for one of a plurality of ARQ channels;
determine upon obtaining the decoded packet and based at least in part on packet timing on each of the plurality of ARQ channels whether an earlier packet is still pending on any one other of the plurality of ARQ channels based on decoded packets for the any one other of the plurality of ARQ channels, each pending earlier packet being a packet that was sent before the decoded packet and may still be received; and
forward the decoded packet if there are no pending earlier packets.

* * * * *